US011915280B1

(12) United States Patent
Biswas

(10) Patent No.: US 11,915,280 B1
(45) Date of Patent: *Feb. 27, 2024

(54) PARASITIC POSTAGE INDICIA

(71) Applicant: Stamps.com Inc., El Segundo, CA (US)

(72) Inventor: Michael J Biswas, Los Angeles, CA (US)

(73) Assignee: AUCTANE, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,326

(22) Filed: Jul. 14, 2022

Related U.S. Application Data

(63) Continuation of application No. 16/447,876, filed on Jun. 20, 2019, now Pat. No. 11,436,650, which is a (Continued)

(51) Int. Cl.
*G06Q 30/04* (2012.01)
*G07B 17/00* (2006.01)

(52) U.S. Cl.
CPC ......... *G06Q 30/04* (2013.01); *G06Q 2220/00* (2013.01); *G07B 17/00508* (2013.01); *G07B 2017/00064* (2013.01)

(58) Field of Classification Search
CPC ........... G06Q 20/3276; G06Q 2220/00; G06Q 30/04; G06Q 10/083; G06Q 2220/10;
(Continued)

(56) References Cited

U.S. PATENT DOCUMENTS 1,684,756 A 9/1928 Close
1,988,908 A 1/1935 MacKinnon
(Continued)

FOREIGN PATENT DOCUMENTS

JP 05-132049 A1 5/1993
JP 09-508220 A1 8/1997
(Continued)

OTHER PUBLICATIONS

"New Postal Imprinting to Affect Soho." Managing Office Technology 42.6 (1997): 13. ProQuest. Web. Oct. 21, 2023. (Year: 1997).*

(Continued)

*Primary Examiner* — Michael P Harrington
(74) *Attorney, Agent, or Firm* — Concept IP LLP; Pejman Yedidsion

(57) ABSTRACT

Systems and methods which provide parasitic postage indicia comprising thin indicium information and corresponding postage indicium data are shown. The thin indicium information may be disposed in a mail scan block in parasitism for use in identifying the corresponding postage indicium data. This thin indicium information may comprise one or more pieces of information configured to be carried within a structure of a mail scan block present on a mail item and which uniquely or substantially uniquely identifies a postage indicium data packet comprised of postage indicium data. The postage indicium data may be generated as proof of payment for postal services and stored for access using the thin indicium information. As a mail item is processed a mail scan block thereon may be scanned and the thin indicium information extracted for identifying a corresponding postage indicium data packet for proof of payment for postal services.

20 Claims, 3 Drawing Sheets

Related U.S. Application Data continuation of application No. 13/271,572, filed on Oct. 12, 2011, now Pat. No. 10,373,216.

(58) Field of Classification Search
CPC ........... G06Q 2250/30; G06Q 2250/00; G07B 2017/00443; G07B 17/00508; G07B 2017/00588; G07B 2017/00145; G07B 2017/00064; G07B 17/00733; G07B 2017/0058
See application file for complete search history.

(56) References Cited

U.S. PATENT DOCUMENTS 2,148,155 A 2/1939 Grossman
2,825,498 A 3/1958 Alves
2,887,326 A 5/1959 Kramer
3,221,980 A 12/1965 Mercur
3,380,648 A 4/1968 De Lyra
3,658,239 A 4/1972 Foutz
3,747,837 A 7/1973 Wilson
3,978,457 A 8/1976 Check, Jr. et al.
4,024,380 A 5/1977 Gunn
4,245,775 A 1/1981 Conn
4,271,481 A 6/1981 Check, Jr. et al.
4,306,299 A 12/1981 Check, Jr. et al.
4,511,793 A 4/1985 Racanelli
4,565,317 A 1/1986 Kranz
4,629,871 A 12/1986 Scribner et al.
4,641,347 A 2/1987 Clark et al.
4,649,266 A 3/1987 Eckert
4,661,001 A 4/1987 Takai et al.
4,709,850 A 12/1987 Wagner
4,725,718 A 2/1988 Sansone et al.
4,743,747 A 5/1988 Fougere et al.
4,757,537 A 7/1988 Edelmann et al.
4,760,532 A 7/1988 Sansone et al.
4,763,271 A 8/1988 Field
4,775,246 A 10/1988 Edelmann et al.
4,784,317 A 11/1988 Chen et al.
4,800,506 A 1/1989 Axelrod et al.
4,802,218 A 1/1989 Wright et al.
4,812,994 A 3/1989 Taylor et al.
4,821,195 A 4/1989 Baer et al.
4,831,554 A 5/1989 Storace et al.
4,831,555 A 5/1989 Sansone et al.
4,853,865 A 8/1989 Sansone et al.
4,862,386 A 8/1989 Axelrod et al.
4,864,618 A 9/1989 Wright et al.
4,868,757 A 9/1989 Gil
4,872,706 A 10/1989 Brewen et al.
4,900,903 A 2/1990 Wright et al.
4,900,904 A 2/1990 Wright et al.
4,901,241 A 2/1990 Schneck
4,910,686 A 3/1990 Chang et al.
4,919,325 A 4/1990 Culver
4,933,849 A 6/1990 Connell et al.
4,934,846 A 6/1990 Gilham
4,947,333 A 8/1990 Sansone et al.
4,993,752 A 2/1991 Juszak
4,998,204 A 3/1991 Sansone et al.
5,025,141 A 6/1991 Bolan
5,065,000 A 11/1991 Pusic
5,085,470 A 2/1992 Peach et al.
5,091,771 A 2/1992 Bolan et al.
5,111,030 A 5/1992 Brasington et al.
5,119,306 A 6/1992 Metelits et al.
5,136,647 A 8/1992 Haber et al.
5,200,903 A 4/1993 Gilham et al.
5,237,506 A 8/1993 Horbal et al.
5,239,168 A 8/1993 Dursty, Jr. et al.
5,280,531 A 1/1994 Hunter
5,316,208 A 5/1994 Petkovsek
5,319,562 A 6/1994 Whitehouse
5,341,505 A 8/1994 Whitehouse
5,360,628 A 11/1994 Butland
5,375,172 A 12/1994 Chrosny
5,388,049 A 2/1995 Sansone et al.
5,410,642 A 4/1995 Hakamatsuka et al.
5,423,573 A 6/1995 de Passille
5,425,586 A 6/1995 Berson
5,437,441 A 8/1995 Tuhro et al.
5,439,721 A 8/1995 Pedroli et al.
5,449,200 A 9/1995 Andric et al.
5,454,038 A 9/1995 Cordery et al.
5,471,925 A 12/1995 Heinrich et al.
5,476,420 A 12/1995 Manning
5,490,077 A 2/1996 Freytag
5,494,445 A 2/1996 Sekiguchi et al.
5,501,393 A 3/1996 Walz
5,510,992 A 4/1996 Kara
5,524,995 A 6/1996 Brookner et al.
5,554,842 A 9/1996 Connell et al.
5,573,277 A 11/1996 Petkovsek
5,598,970 A 2/1997 Mudry et al.
5,600,562 A 2/1997 Guenther
5,602,743 A 2/1997 Fraytag
5,606,507 A 2/1997 Kara
5,606,508 A 2/1997 Thiel
5,612,889 A 3/1997 Pintsov et al.
5,615,123 A 3/1997 Davidson et al.
5,615,312 A 3/1997 Kohler
5,617,519 A 4/1997 Herbert
5,650,934 A 7/1997 Manduley
5,651,238 A 7/1997 Belec et al.
5,666,215 A 9/1997 Fredlund et al.
5,666,284 A 9/1997 Kara
5,682,318 A 10/1997 Kara
5,717,597 A 2/1998 Kara
5,717,980 A 2/1998 Oka et al.
5,737,729 A 4/1998 Denman
5,774,886 A 6/1998 Kara
5,778,076 A 7/1998 Kara et al.
5,791,553 A 8/1998 Fabel
5,796,834 A 8/1998 Whitney et al.
5,801,364 A 9/1998 Kara et al.
5,801,944 A 9/1998 Kara
5,805,810 A 9/1998 Maxwell
5,812,991 A 9/1998 Kara
5,819,240 A 10/1998 Kara
5,822,739 A 10/1998 Kara
5,825,893 A 10/1998 Kara
5,873,605 A 2/1999 Kaplan
5,884,277 A 3/1999 Khosla
5,902,439 A 5/1999 Pike et al.
5,923,406 A 7/1999 Brasington et al.
5,929,415 A 7/1999 Berson
5,932,139 A 8/1999 Oshima et al.
5,936,865 A 8/1999 Pintsov et al.
5,995,985 A 11/1999 Cai
6,005,945 A 12/1999 Whitehouse
6,010,156 A 1/2000 Block
6,026,385 A 2/2000 Harvey et al.
6,033,751 A 3/2000 Kline
6,085,126 A 7/2000 Mellgren, III et al.
D434,438 S 11/2000 Kara
6,155,476 A 12/2000 Fabel
6,173,888 B1 1/2001 Fabel
6,175,826 B1 1/2001 Malandra, Jr. et al.
6,181,433 B1 1/2001 Hayama et al.
6,208,980 B1 3/2001 Kara
6,209,779 B1 4/2001 Fabel
6,234,694 B1 5/2001 Brookner
6,249,777 B1 6/2001 Kara et al.
6,311,240 B1 10/2001 Boone et al.
6,322,192 B1 11/2001 Walker
6,385,504 B1 5/2002 Pintsov et al.
6,415,983 B1 7/2002 Ulvr et al.
6,427,021 B1 7/2002 Fischer et al.
6,428,219 B1 8/2002 Stier et al.
6,438,530 B1 8/2002 Heiden et al.
6,442,525 B1 8/2002 Silverbrook et al.
6,461,063 B1 10/2002 Miller et al.
6,466,921 B1 10/2002 Cordery et al.

(56) References Cited

U.S. PATENT DOCUMENTS

| | | | |
|---|---|---|---|
| 6,505,179 B1 | 1/2003 | Kara | |
| 6,505,980 B1 | 1/2003 | Allday | |
| 6,523,014 B1 | 2/2003 | Pauschinger | |
| 6,526,391 B1 | 2/2003 | Cordery et al. | |
| 6,567,794 B1 | 5/2003 | Cordery et al. | |
| 6,594,374 B1 | 7/2003 | Beckstrom et al. | |
| 6,595,412 B2 | 7/2003 | Manduley | |
| 6,650,433 B1 | 11/2003 | Keane et al. | |
| 6,655,579 B1 | 12/2003 | Delman et al. | |
| 6,671,813 B2 | 12/2003 | Ananda | |
| 6,692,031 B2 | 2/2004 | McGrew | |
| 6,697,822 B1 | 2/2004 | Armatis et al. | |
| 6,701,304 B2 | 3/2004 | Leon | |
| 6,722,563 B1 | 4/2004 | Johnson et al. | |
| 6,735,575 B1 | 5/2004 | Kara | |
| 6,820,201 B1 | 11/2004 | Lincoln et al. | |
| 6,834,112 B1 | 12/2004 | Brickell | |
| 6,834,273 B1 | 12/2004 | Sansone et al. | |
| 6,868,406 B1 | 3/2005 | Ogg et al. | |
| 6,904,168 B1 | 6/2005 | Steinberg et al. | |
| 6,946,960 B2 | 9/2005 | Sisson et al. | |
| 6,972,859 B1 | 12/2005 | Patton et al. | |
| 7,069,253 B2 | 6/2006 | Leon | |
| 7,085,725 B1 | 8/2006 | Leon | |
| 7,117,363 B2 | 10/2006 | Lincoln et al. | |
| 7,127,434 B2 | 10/2006 | Burningham | |
| 7,149,726 B1 | 12/2006 | Lingle et al. | |
| 7,162,460 B2 | 1/2007 | Cleckler et al. | |
| 7,191,158 B2 | 3/2007 | Ogg | |
| 7,191,336 B2 | 3/2007 | Zeller et al. | |
| 7,194,957 B1 | 3/2007 | Leon et al. | |
| 7,201,305 B1 | 4/2007 | Correa | |
| 7,222,236 B1 | 5/2007 | Pagel | |
| 7,234,645 B2 | 6/2007 | Silverbrook et al. | |
| 7,243,842 B1 | 7/2007 | Leon et al. | |
| RE39,779 E | 8/2007 | Kovlakas | |
| 7,266,531 B2 | 9/2007 | Pintsov et al. | |
| 7,305,556 B2 | 12/2007 | Slick et al. | |
| 7,418,599 B2 | 8/2008 | Peters | |
| 7,433,849 B2 | 10/2008 | Cordery et al. | |
| 7,509,291 B2 | 3/2009 | McBride et al. | |
| 7,577,618 B2 | 8/2009 | Raju et al. | |
| 7,639,898 B1 | 12/2009 | Chan | |
| 7,778,939 B2 | 8/2010 | Ogg et al. | |
| 7,828,223 B1 | 11/2010 | Leon et al. | |
| 7,831,518 B2 | 11/2010 | Montgomery et al. | |
| 7,874,593 B1 | 1/2011 | Clem | |
| 7,933,845 B1 | 4/2011 | Leon et al. | |
| 7,979,358 B1 | 7/2011 | Clem et al. | |
| 8,065,239 B1 | 11/2011 | McBride et al. | |
| 8,100,324 B1 | 1/2012 | Leon | |
| 8,195,579 B2 | 6/2012 | Kara | |
| 8,336,916 B1 | 12/2012 | Clem | |
| 8,360,313 B1 | 1/2013 | Leon et al. | |
| 8,505,978 B1 | 8/2013 | Leon | |
| 8,818,915 B1 | 8/2014 | Leon et al. | |
| 2001/0013025 A1 | 8/2001 | Ananda | |
| 2001/0032156 A1 | 10/2001 | Candura et al. | |
| 2001/0042052 A1 | 11/2001 | Leon | |
| 2001/0054153 A1 | 12/2001 | Wheeler et al. | |
| 2002/0023057 A1 | 2/2002 | Goodwin et al. | |
| 2002/0033598 A1 | 3/2002 | Beasley | |
| 2002/0046195 A1 | 4/2002 | Martin et al. | |
| 2002/0073039 A1 | 6/2002 | Ogg et al. | |
| 2002/0083020 A1 | 6/2002 | Leon | |
| 2002/0083021 A1 | 6/2002 | Ryan et al. | |
| 2002/0149195 A1 | 10/2002 | Beasley | |
| 2002/0149495 A1 | 10/2002 | Schach et al. | |
| 2002/0190117 A1 | 12/2002 | Manduley | |
| 2002/0194983 A1 | 12/2002 | Tanner | |
| 2003/0002709 A1 | 1/2003 | Wu | |
| 2003/0030270 A1 | 2/2003 | Franko et al. | |
| 2003/0059635 A1 | 3/2003 | Naasani | |
| 2003/0078893 A1 | 4/2003 | Shah et al. | |
| 2003/0088426 A1 | 5/2003 | Benson et al. | |
| 2003/0093556 A1 | 5/2003 | Yeung et al. | |
| 2003/0101143 A1 | 5/2003 | Montgomery et al. | |
| 2003/0101147 A1 | 5/2003 | Montgomery et al. | |
| 2003/0101148 A1 | 5/2003 | Montgomery et al. | |
| 2003/0130954 A1 | 7/2003 | Carr et al. | |
| 2003/0140017 A1 | 7/2003 | Patton et al. | |
| 2003/0144972 A1 | 7/2003 | Cordery et al. | |
| 2003/0182245 A1 | 9/2003 | Seo | |
| 2004/0000787 A1 | 1/2004 | Vig et al. | |
| 2004/0070194 A1 | 4/2004 | Janetzke et al. | |
| 2004/0174012 A1 | 9/2004 | Hagen | |
| 2004/0200902 A1 | 10/2004 | Ishioroshi | |
| 2004/0215523 A1 | 10/2004 | Wulff et al. | |
| 2004/0220935 A1 | 11/2004 | McGraw et al. | |
| 2004/0236938 A1 | 11/2004 | Callaghan | |
| 2004/0241424 A1 | 12/2004 | Barbera-Guillem | |
| 2004/0254898 A1 | 12/2004 | Parker et al. | |
| 2005/0065897 A1 | 3/2005 | Ryan et al. | |
| 2005/0071296 A1 | 3/2005 | Lepkofker | |
| 2005/0071297 A1 | 3/2005 | Kara | |
| 2005/0080751 A1 | 4/2005 | Burningham | |
| 2005/0082818 A1 | 4/2005 | Mertens | |
| 2005/0114276 A1 | 5/2005 | Hunter et al. | |
| 2005/0120042 A1 | 6/2005 | Shuster et al. | |
| 2005/0195214 A1 | 9/2005 | Reid et al. | |
| 2005/0251399 A1 | 11/2005 | Agarwal et al. | |
| 2006/0116971 A1 | 6/2006 | Beckstrom et al. | |
| 2006/0136347 A1 | 6/2006 | Reichelsheimer et al. | |
| 2006/0173796 A1 | 8/2006 | Kara | |
| 2006/0248348 A1 | 11/2006 | Wakao et al. | |
| 2006/0287096 A1 | 12/2006 | O'Kelley, II et al. | |
| 2007/0005518 A1 | 1/2007 | Beckstrom et al. | |
| 2007/0011023 A1 | 1/2007 | Silverbrook | |
| 2007/0011995 A1 | 1/2007 | Weaver et al. | |
| 2007/0017985 A1 | 1/2007 | Lapstun et al. | |
| 2007/0108302 A1 | 5/2007 | Pintsov et al. | |
| 2007/0198441 A1 | 8/2007 | Kara | |
| 2007/0255664 A1 | 11/2007 | Blumberg et al. | |
| 2009/0125561 A1 | 5/2009 | Garcia | |
| 2010/0004939 A1* | 1/2010 | Ferraro | G07B 17/00508 705/1.1 |
| 2010/0230328 A1 | 9/2010 | Bonnell et al. | |

FOREIGN PATENT DOCUMENTS

| | | |
|---|---|---|
| JP | 2005-215905 A | 8/2005 |
| WO | WO-1995/19016 A2 | 7/1995 |
| WO | WO-9704353 A1 | 2/1997 |

OTHER PUBLICATIONS

U.S. Appl. No. 12/316,542, JP Leon.

U.S. Appl. No. 12/354,466, Kara.

U.S. Appl. No. 13/038,029, Leon et al.

"Endicia Announces PictureItPostage™," Jun. 6, 2005, http://www.endicia.com/-/media/Files/About%20Us/Press%20Room/Endicia_pr05-06-06.ashx>, 2 pages.

"Information-Based Indicia Program (IBIP) Performance Criteria for Information-Based Indicia and Security Architecture for Closed IBI Postage Metering Systems (PCIBI-C)," Jan. 12, 1999, The United States Postal Service (USPS), 49 pages.

"New Version of Leading A2iA CheckReader Recognition Software Now Integrates Document Identification, Image Usability and Handwritten Address Capture." Business Wire, Apr. 26, 2004, 2 pages.

"Service Contract: Profit Center or Necessary Evil. (heating and air conditioning maintenance contracts)," Whitaker, Bert, Air Conditioning, Heating and Refrigeration News, V. 192, N3, 3 pages.

"Zazzle® Offers Zazzle Custom Stamps™ for Business," May 17, 2006, https://www.zazzle.com/about/press/releases?pr=12624, 2 pages.

Appeal Decision dated Apr. 20, 2010 for U.S. Appl. No. 10/991,241 to Kara, filed Nov. 17, 2004, and entitled "System and Method for Generating Personalized Postage Indicia," 9 pages.

Brown, B., "Internet Postage Services," PC Magazine, Jun. 6, 2000, p. 133, Ziff-Davis Publishing Company, 1 page.

Examiner's Answer to Appeal Brief dated Feb. 19, 2009 for U.S. Appl. No. 10/991,241 to Kara, filed Nov. 17, 2004, and entitled

(56) References Cited

OTHER PUBLICATIONS

"System and Method for Generating Personalized Postage Indicia," 14 pages.
Final Office Action dated Apr. 26, 2011 for U.S. Appl. No. 10/994,914 to McBride et al., filed Nov. 22, 2004, and entitled "Customized Computer-Based Value-Bearing Item Quality Assurance," 8 pages.
Final Office Action dated Jan. 25, 2012 for U.S. Appl. No. 10/994,728 to Huebner et al., filed Nov. 22, 2004, and entitled "Printing of Computer-Based Value-Bearing Items," 22 pages.
Final Office Action dated Jan. 31, 2006 for U.S. Appl. No. 10/991,241 to Kara, filed Nov. 17, 2004, and entitled "System and Method for Generating Personalized Postage Indicia," 13 pages.
Final Office Action dated Jun. 30, 2010 for U.S. Appl. No. 11/114,964 to Clem et al., filed Apr. 25, 2005, and entitled "Quality Assurance of Image-Customization of Computer-Based Value-Bearing Items," 23 pages.
Final Office Action dated Mar. 4, 2009 for U.S. Appl. No. 10/994,698 to Leon et al., filed Nov. 22, 2004, and entitled "Image Customization of Computer-Based Value-Bearing Items," 12 pages.
Final Office Action dated May 11, 2010 for U.S. Appl. No. 10/994,698 to Leon et al., filed Nov. 22, 2004, and entitled "Image Customization of Computer-Based Value-Bearing Items," 18 pages.
Final Office Action dated Nov. 16, 2011 for U.S. Appl. No. 12/943,519 to Clem, filed Nov. 10, 2010, and entitled "Rolls Of Image-Customized Value-Bearing Items And Systems And Methods For Providing Rolls Of Image-Customized Value-Bearing Items," 16 pages.
Final Office Action dated Nov. 4, 2010 for U.S. Appl. No. 11/644,458 to Leon, filed Dec. 20, 2006, and entitled "Systems and Methods for Creating and Providing Shape-Customized, Computer-Based, Value-Bearing Items," 22 pages.
Minnick, Robert, "Postage Imprinting Apparatus and Methods for Use With a Computer Printer", Apr. 27, 1995, 71 pages.
Non-Final Office Action dated Aug. 19, 2008 for U.S. Appl. No. 10/994,698 to Leon et al., filed Nov. 22, 2004, and entitled "Image Customization of Computer-Based Value-Bearing Items," 16 pages.
Non-Final Office Action dated Aug. 3, 2009 for U.S. Appl. No. 10/994,698 to Leon et al., filed Nov. 22, 2004, and entitled "Image Customization of Computer-Based Value-Bearing Items," 13 pages.
Non-Final Office Action dated Dec. 31, 2007 for U.S. Appl. No. 10/991,241 to Kara, filed Nov. 17, 2004, and entitled "System and Method for Generating Personalized Postage Indicia," 11 pages.
Non-Final Office Action dated Dec. 9, 2009 for U.S. Appl. No. 11/729,239 to Leon et al., filed Mar. 28, 2007, and entitled "Computer-Based Value-Bearing Item Customization Security," 6 pages.
Non-Final Office Action dated Jul. 12, 2007 for U.S. Appl. No. 10/991,241 to Kara, filed Nov. 17, 2004, and entitled "System and Method for Generating Personalized Postage Indicia," 11 pages.
Non-Final Office Action dated Jul. 19, 2005 for U.S. Appl. No. 10/991,241 to Kara, filed Nov. 17, 2004, and entitled "System and Method for Generating Personalized Postage Indicia," 9 pages.
Non-Final Office Action dated Jul. 21, 2011 for U.S. Appl. No. 10/994,728 to Huebner et al., filed Nov. 22, 2004, and entitled "Printing of Computer-Based Value-Bearing Items," 32 pages.
Non-Final Office Action dated Jul. 7, 2008 for U.S. Appl. No. 10/991,241 to Kara, filed Nov. 17, 2004, and entitled "System and Method for Generating Personalized Postage Indicia," 12 pages.
Non-Final Office Action dated Mar. 5, 2012 for U.S. Appl. No. 12/943,519 to Clem, filed Nov. 10, 2010, and entitled "Rolls Of Image-Customized Value-Bearing Items And Systems And Methods For Providing Rolls Of Image-Customized Value-Bearing Items," 15 pages.
Non-Final Office Action dated May 13, 2010 for U.S. Appl. No. 11/729,148 to Leon et al., filed Mar. 27, 2007, and entitled "Computer-Based Value-Bearing Item Customization Security," 10 pages.
Non-Final Office Action dated May 25, 2011 for U.S. Appl. No. 12/316,240 to Leon, filed Dec. 9, 2008, and entitled "System and Method for Facilitating Replacement of Computer-Based Value-Bearing Items," 7 pages.
Non-Final Office Action dated May 31, 2012 for U.S. Appl. No. 13/081,356 to Leon et al., filed Apr. 6, 2011 and entitled "Computer-Based Value-Bearing Item Customization Security," 9 pages.
Non-Final Office Action dated Oct. 31, 2006 for U.S. Appl. No. 10/991,241 to Kara, filed Nov. 17, 2004, and entitled "System and Method for Generating Personalized Postage Indicia," 11 pages.
Non-Final Office Action dated Sep. 13, 2012 for U.S. Appl. No. 11/644,458 to Leon, filed Dec. 20, 2006, and entitled "Systems and Methods for Creating and Providing Shape-Customized, Computer-Based, Value-Bearing Items," 26 pages.
Notice of Abandonment dated Jun. 30, 2010 for U.S. Appl. No. 10/991,241 to Kara, filed Nov. 17, 2004, and entitled "System and Method for Generating Personalized Postage Indicia," 2 pages.
Notice of Allowance dated Apr. 1, 2013 for U.S. Appl. No. 11/644,458 to Leon, filed Dec. 20, 2006, and entitled "Systems and Methods for Creating and Providing Shape-Customized, Computer-Based, Value-Bearing Items," 10 pages.
Notice of Allowance dated Aug. 24, 2012 for U.S. Appl. No. 12/943,519 to Clem, filed Nov. 10, 2010, and entitled "Rolls Of Image-Customized Value-Bearing Items And Systems And Methods For Providing Rolls Of Image-Customized Value-Bearing Items," 8 pages.
Notice of Allowance dated Aug. 5, 2010 for U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 11 pages.
Notice of Allowance dated Dec. 2, 2010 for U.S. Appl. No. 10/994,698 to Leon et al., filed Nov. 22, 2004, and entitled "Image Customization of Computer-Based Value-Bearing Items," 5 pages.
Notice of Allowance dated Dec. 21, 2011 for U.S. Appl. No. 12/316,240 to Leon, filed Dec. 9, 2008, and entitled "System and Method for Facilitating Replacement of Computer-Based Value-Bearing Items," 6 pages.
Notice of Allowance dated Feb. 3, 2011 for U.S. Appl. No. 11/114,964 to Clem et al., filed Apr. 25, 2005, and entitled "Quality Assurance of Image-Customization of Computer-Based Value-Bearing Items," 7 pages.
Notice of Allowance dated Jan. 31, 2011 for U.S. Appl. No. 11/729,148 to Leon et al., filed Mar. 27, 2007, and entitled "Computer-Based Value-Bearing Item Customization Security," 7 pages.
Notice of Allowance dated Jan. 5, 2007 for U.S. Appl. No. 10/994,768 to Leon et al., filed Nov. 22, 2004, and entitled "Computer-Based Value-Bearing Item Customization Security," 7 pages.
Notice of Allowance dated Jul. 15, 2011 for U.S. Appl. No. 10/994,914 to McBride et al., filed Nov. 22, 2004, and entitled "Customized Computer-Based Value-Bearing Item Quality Assurance," 8 pages.
Notice of Allowance dated Jun. 24, 2010 for U.S. Appl. No. 11/729,239 to Leon et al., filed Mar. 28, 2007, and entitled "Computer-Based Value-Bearing Item Customization Security," 6 pages.
Notice of Allowance dated Nov. 17, 2008 for U.S. Appl. No. 11/635,871 to McBride et al., filed Dec. 8, 2006, and entitled "Formatting Value-Bearing Item Indicia," 7 pages.
Notice of Allowance dated Nov. 24, 2008 for U.S. Appl. No. 10/197,044 to Raju et al., filed Jul. 16, 2002, and entitled "Generic Value Bearing Item Labels," 7 pages.
Notice of Allowance dated Sep. 1, 2010 for U.S. Appl. No. 11/729,148 to Leon et al., filed Mar. 27, 2007, and entitled "Computer-Based Value-Bearing Item Customization Security," 7 pages.
Notice of Allowance dated Sep. 15, 2011 for U.S. Appl. No. 12/316,240 to Leon, filed Dec. 9, 2008, and entitled "System and Method for Facilitating Replacement of Computer-Based Value-Bearing Items," 7 pages.
Notice of Allowance dated Sep. 5, 2012 for U.S. Appl. No. 13/081,356 to Leon et al., filed Apr. 6, 2011 and entitled "Computer-Based Value-Bearing Item Customization Security," 7 pages.
Office Action issued for Japanese Patent Application No. 515,253/1997, dated Apr. 21, 2009; 5 pages (with English language translation).
Office Action dated Mar. 13, 2007 for JP 515,253/97; with English language translation (4 pages).

(56) References Cited

OTHER PUBLICATIONS

Porter, William, "Canadians Take to Vanity Stamps in Very Big Way," Denver Post, Jul. 9, 2000, 2 pages.
Preliminary Amendment for U.S. Appl. No. 13/081,356 to Leon et al., filed Apr. 6, 2011 and entitled "Computer-Based Value-Bearing Item Customization Security," 10 pages.
Ralph, J. "What's Selling: From Bricks and Mortar to Bricks and Clicks," Playthings Magazine, Feb. 1, 2003, 4 pages.
U.S. Appl. No. 10/994,728 to Huebner et al., filed Nov. 22, 2004, and entitled "Printing of Computer-Based Value-Bearing Items," 122 pages.
U.S. Appl. No. 11/644,458 to Leon, filed Dec. 20, 2006, and entitled "Systems and Methods for Creating and Providing Shape-Customized, Computer-Based, Value-Bearing Items," 77 pages.
U.S. Appl. No. 12/500,970 to Clem, filed Jul. 10, 2009, and entitled "Automatic Guarantee Delivery Tracking and Reporting for United States Postal Service Postage Refunds for Paid Computer-Based Postage," 70 pages.
U.S. Appl. No. 12/943,519 to Clem, filed Nov. 10, 2010, and entitled "Rolls Of Image-Customized Value-Bearing Items And Systems And Methods For Providing Rolls Of Image-Customized Value-Bearing Items," 65 pages.
Yakal, K, "Electronic Postage," Home Office Computing 19.2 (2001): 67, ProQuest, Web Mar. 4, 2019 (2001).
Pavely, R. W., Intelligent Indicias, Office Systems, vol. 13, No. 11, pp. 18-19, 1996, https://dialong.proquest.com/professional/docview/216438586?accountid=131444.

* cited by examiner

PARASITIC POSTAGE INDICIA

CROSS-REFERENCE TO RELATED APPLICATIONS

The present application is a continuation of U.S. patent application Ser. No. 16/447,876, filed Jun. 20, 2019 and entitled "PARASITIC POSTAGE INDICIA," which is a continuation of U.S. patent application Ser. No. 13/271,572, filed Oct. 12, 2011 and entitled "PARASITIC POSTAGE INDICIA," which issued Aug. 6, 2019 as U.S. Pat. No. 10,373,216, which is related to commonly assigned U.S. patent application Ser. No. 13/038,029, filed Mar. 1, 2011 and entitled "IMAGE-CUSTOMIZATION OF COMPUTER-BASED VALUE-BEARING ITEMS," which issued Aug. 26, 2014 as U.S. Pat. No. 8,818,915, U.S. patent application Ser. No. 12/316,542, filed Dec. 11, 2008 and entitled "MAIL PIECE PROCESSING," and U.S. patent application Ser. No. 12/354,466, filed Jan. 15, 2009 and entitled "SYSTEM AND METHOD FOR PRINTING POSTAGE INDICIA WITH POST-BY DATE," which issued Jun. 5, 2012 as U.S. Pat. No. 8,195,579, the disclosures of which are hereby incorporated herein by reference in their entirety.

TECHNICAL FIELD

The present invention relates generally to postage indicia and, more particularly, to providing postage indicia using thin indicia information in a mail scan block in parasitism.

BACKGROUND OF THE INVENTION

The use of various forms of postage indicia, as may be printed directly on a mail item or upon label stock to be applied to a mail item, have been used for a number of years to show proof of payment for postal services with respect to the mail item. For example, traditional meter stamps are usually struck by a postage meter die using a fluorescent ink and displayed in the upper right hand corner of a face of the mail piece for shipping services proof of payment. The aforementioned fluorescent ink may, among other things, be used to "face" the mail item for automated processing. That is, automated equipment may use special lighting (e.g., ultraviolet light) to cause the postage indicia to fluoresce and thus identify the face of the mail item bearing the indicia as well as the orientation of that face, as may be useful in scanning for other information such as addressee and/or addressor information.

More recently, computer-based systems (e.g., general purpose personal computer systems) for generating and printing postage indicia in the form of an information based indicia (IBI), such as a two dimensional bar code encoding information from which the postage indicium may be verified as valid, have been used to show proof of payment for postal services. Because such IBI based postage indicia are generally printed using general purpose printer systems (e.g., consumer inkjet or laser printers), these postage indicia are often used in combination with a facing identification mark (FIM), such as may comprise a simple bar code which is often printed using fluorescent or phosphorescent ink, as may be printed with the postage indicia or otherwise present on the stock for use in facing the mail item for automated processing.

In order to provide reliable proof of payment, various techniques for verification of the postage indicia may be used. For example, the above mentioned traditional meter stamp postage indicia may utilize a postage meter die imparting a relatively difficult to reproduce image. This, coupled with the use of fluorescent ink which has only limited availability provides at least some level of visible verifiability of the postage indicia. The above mentioned postage indicia comprising IBI may be scanned using processor-based mail processing equipment to extract information encoded within the IBI A digital signature of this extracted information may be verified and/or particular information of this extracted information (e.g., addressee information, date information, etc.) may be analyzed to verify the postage indicia.

Although the foregoing postage indicia have been widely accepted for use in posting mail items in both personal and business use, their use is not without drawback. In particular, there are disadvantages both with respect to the postal service providers (e.g., the United States Postal Service (USPS)) and the users of those services (e.g., the mailers).

For example, of disadvantage to the postal service providers is the fact that the visual verification features of the traditional meter stamp postage indicia are becoming less reliable in the present world of image processing and reproduction capability. The IBI of the more modern postage indicia require particular scanning equipment that has not yet become ubiquitous in mail processing infrastructure.

Of disadvantage to the users of postal services, the use of traditional meters often requires the stocking and handling of specialized ink used in the fluorescent meter stamp impression. Moreover, when processing a number of mail items for posting several steps are often required in order to print address labels, apply address labels to the mail items, and print postage indicia, where printing the postage indicia may involve printing postage indicia upon label stock (particularly in the case of using general purpose personal computer systems for printing postage indicia) thus further requiring applying the postage indicia to the corresponding mail items.

In resent times, postal service providers have implemented other information based features, in addition to the aforementioned IBI, to facilitate the handling and processing of mail items. For example, the USPS has introduced the intelligent mail (IM) barcode (also referred to as one code solution and 4-state customer barcode (4CB, 4-CB, or USPS4CB), wherein the term "intelligent mail" refers to services offered by the USPS for domestic mail delivery, which effectively incorporates routing ZIP code and tracking information. The IM barcode is a 65-bar code which is placed in proximity to (e.g., above or below) the addressee information on the face of mail items in the United States. Because of the simple nature of the IM barcode and its use in routing and providing services by the USPS, scanning equipment capable of extracting information from IM barcodes has already been relatively widely deployed in mail processing infrastructure.

BRIEF SUMMARY OF THE INVENTION

The present invention is directed to systems and methods which provide parasitic postage indicia comprising thin indicium information and corresponding postage indicium data, wherein the thin indicium information is disposed in a mail scan block in parasitism for use in identifying the corresponding postage indicium data. In accordance with embodiments of the invention, thin indicium information may comprise one or more pieces of information configured to be carried within a structure of a mail scan block present on a mail item and which uniquely or substantially uniquely identifies a postage indicium data packet comprised of postage indicium data. The postage indicium data may be generated as proof of payment for postal services, having appropriate security and validation attributes, and stored for access using the aforementioned thin indicium information. Accordingly, as a mail item is processed or otherwise handled a mail scan block thereon may be scanned (perhaps for purposes other than or in addition to proof of payment verification) and the thin indicium information extracted for identifying a corresponding postage indicium data packet for proof of payment for postal services.

Mail scan blocks utilized to host the thin indicia information of embodiments of the invention provides mail handling and/or processing functionality other than facilitating proof of payment for postal services. For example, embodiments of the invention utilize an IM barcode, providing routing and/or tracking information used by the postal service provider, as a mail scan block herein. An IM barcode is used to carry thin indicium information of embodiments herein without alteration of the legacy IM barcode structure. For example, in accordance with embodiments of the invention, information within a plurality of fields of the IM barcode, originally provided for purposes other than postage indicia, is used to provide thin indicium information. Some or all such information may continue to be provided consistent with its legacy use as IM barcode information. Embodiments of the invention, however, may place information unique to thin indicium information within one or more of the fields of the IM barcode.

The use of an IM barcode or similar legacy mail scan block as a host for thin indicia information of embodiments herein facilitates the use of widely deployed scanning equipment with respect to the parasitic postage indicia. That is, scanning equipment initially deployed for use with respect to legacy IM barcode functionality may be leveraged for scanning thin indicia information. Thus, not only may thin indicia information be readily scanned for validation of parasitic postage indicia postage herein, but additional functionality such as rudimentary tracking may be implemented through widespread availability of scanning thin indicia information of embodiments.

Moreover, the use of an IM barcode or similarly placed mail scan block as a host for thin indicia information of embodiments herein facilitates the implementation of postage indicia with fewer steps by a mailer. For example, because an IM barcode is disposed in proximity to addressee information, the thin indicium information of embodiments herein may be printed coincident with the printing of the addressee information, whether upon the mail item or label stock to be applied thereto, thus avoiding additional steps of separately printing and applying postage indicium to the mail item.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
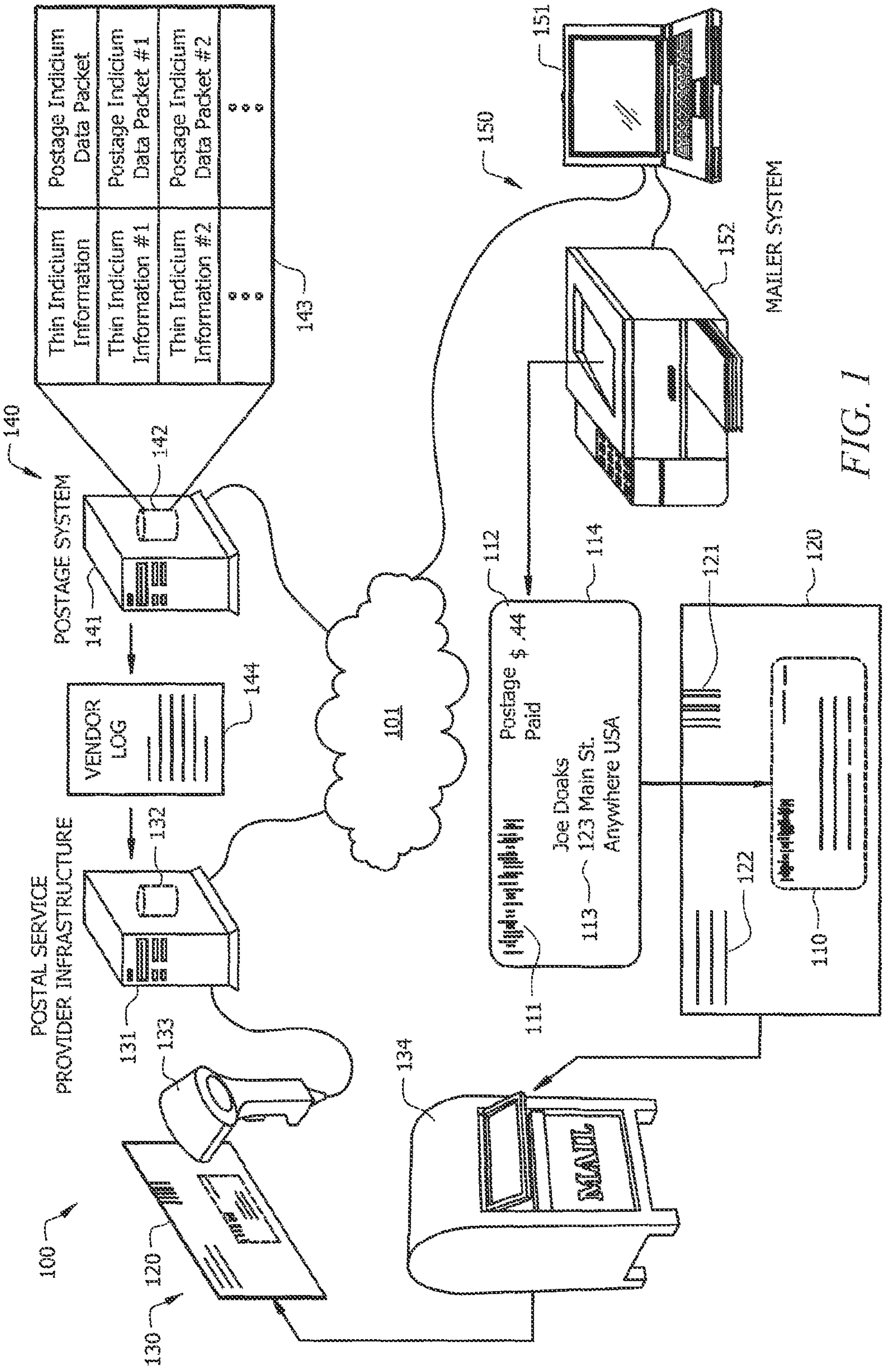
FIG. 1 shows a system adapted to provide parasitic postage indicia in accordance with embodiments of the present invention.

FIG. 1 shows a system adapted to provide parasitic postage indicia in accordance with embodiments of the present invention. In operation according to embodiments, system 100 provides parasitic postage indicia using thin indicium information, identifying corresponding postage indicium data, disposed in a mail scan block in parasitism (i.e., carried within a host functioning for a purpose other than hosting or carrying the thin indicium information, without alteration or adaptation of the host configuration (e.g., format or layout) for its use in carrying the thin indicium information). Accordingly, system 100 of the illustrated embodiment includes postage system 140 and mailer system 150 cooperative to generate parasitic postage indicia (i.e., the aforementioned thin indicium information borne in parasitism and the corresponding postage indicium data) and postal service provider infrastructure 130 operable to utilize the parasitic postage indicia according to embodiments herein.

Postal service provider infrastructure 130 of embodiments provides a processor-based system (e.g., one or more server, computer, workstation, etc. and associated peripherals) adapted to process mail items for which postal services are to be provided. Accordingly, mail server 131 of postal service provider infrastructure 130 of embodiments is adapted to accept input of mail item information (e.g., addressee information, addressor information, routing information, postal services information, proof of payment for services information, etc.), such as through the use of scanner 133 (e.g., an optical scanner, a barcode scanner, a radio frequency identification (RFID) tag reader, etc.), to provide various mail item processing (e.g., mail piece sorting, postal services processing, parasitic postage indicia validation, etc.).

Postage system 140 of embodiments provides a processor-based system (e.g., one or more network application server, computer, etc. and associated peripherals) adapted to generate parasitic postage indicia in accordance with information provided thereto. Accordingly, postage system 140 of embodiments is adapted to communicate with systems (e.g., postal service provider infrastructure 130 and/or mailer system 150), to generate and appropriately account for parasitic postage indicia (e.g., access one or more crypto vault storing value), and to cooperate with other systems utilized in providing parasitic postage indicia of embodiments.

Mailer system 150 of embodiments provides a processor-based system (e.g., one or more computer, workstation, kiosk terminal, etc. and associated peripherals) adapted to cooperate with a postage system (e.g., postage system 140) to generate desired postage indicia and to print information of parasitic postage indicia herein for use on mail items. Accordingly, mailer system 150 of embodiments includes printer 152 (e.g., a laser printer, an ink jet printer, a label printer, etc.) for printing information of parasitic postage indicia, such as part of a mail scan block, directly on mail items (e.g., on mail item 120 as part of postal information block 110) and/or indirectly on mail items (e.g., on label stock 114).

From the foregoing it can be appreciated that postal service provider infrastructure 130, postage system 140, and mailer system 150 of embodiments comprise processor-based systems operating under control of one or more instruction set (e.g., software, firmware, applet, etc.) to provide operation as described herein. Such processor-based systems may comprise a central processing unit (CPU) (e.g., a processor from the PENTIUM or CORE line of processors available from Intel Corporation), memory (e.g., random access memory (RAM), read only memory (ROM), flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.). Peripheral devices, such as one or more printer, scanner (e.g., optical scanner, barcode scanner, and/or biometric sample scanner), etc. may be included for use with any or all of the foregoing processor-based systems according to embodiments herein.

It should be appreciated that although shown in the illustrated embodiment as separate systems, postal service provider infrastructure 130, postage system 140, and mailer system 150 may be provided in other configurations, whether combined or further distributed. A system configuration in which one or more of postal service provider infrastructure 130, postage system 140, and mailer system 150 are combined may be desired in some situations, such as where a postal service provider offers parasitic postage indicia generation and purchase at their public facilities.

Network 101 of the illustrated embodiment provides communication links facilitating the communication between various systems and components of system 100, such as postal service provider infrastructure 130, postage system 140, and mailer system 150. Accordingly, network 101 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

Figure 2:
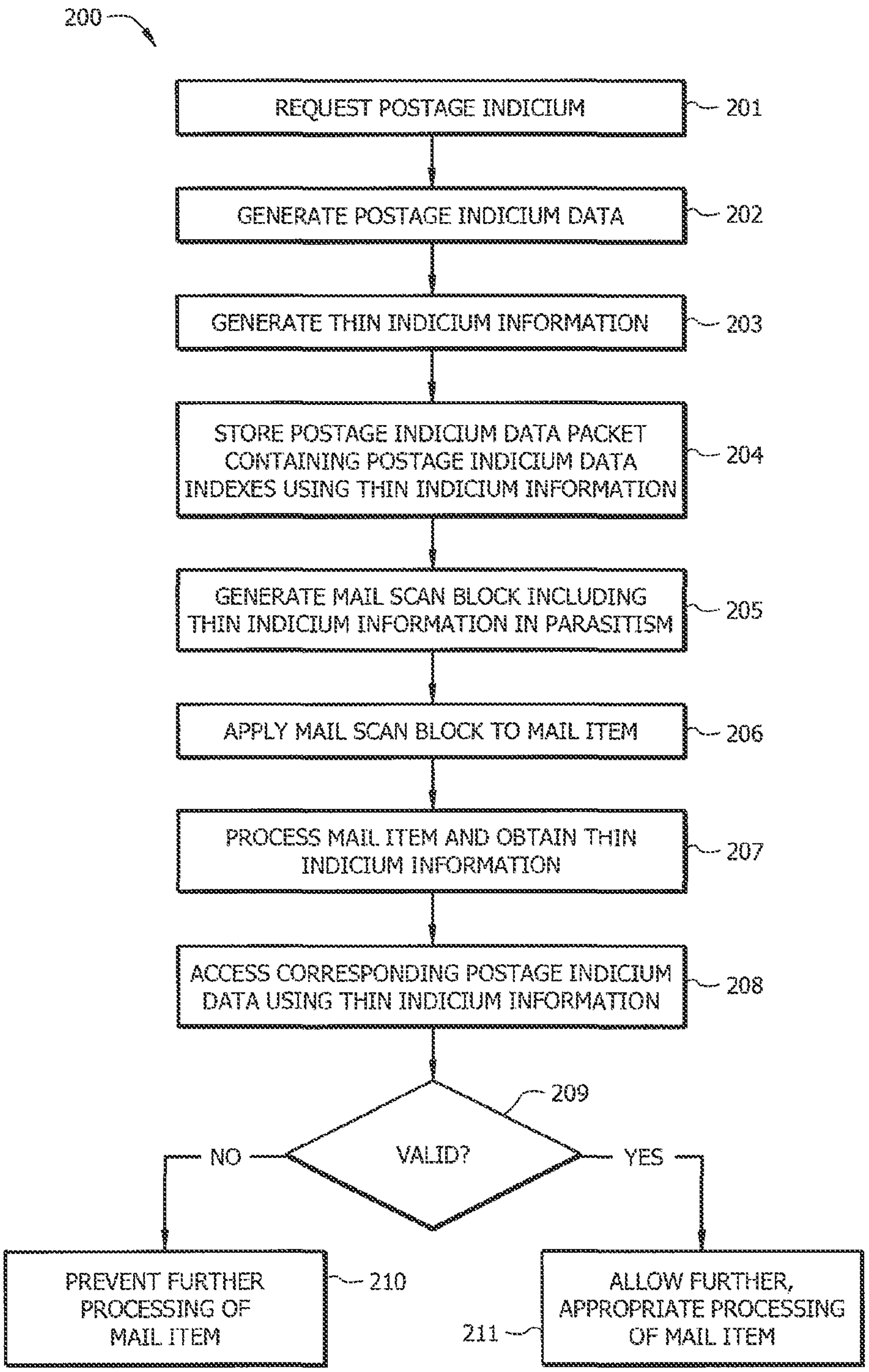
FIG. 2 shows a high level flow diagram of operation of the system of FIG. 1 providing parasitic postage indicia according to embodiments of the invention.

FIG. 2 shows a high level flow diagram of operation of embodiments of system 100 providing parasitic postage indicia as flow 200. In accordance with embodiments herein, a mailer may desire to post one or more mail items and thus seek to obtain postage indicia for these mail items. Accordingly, at block 201 of flow 200 of the illustrated embodiment a mailer requests one or more postage indicium. Parasitic postage indicia may be generated on demand through cooperative operation of mailer system 150 and postage system 140. For example, the mailer may have a postage metering account with a service provider associated with postage system 140, wherein client software operable upon computer 151 of mailer system 150 allows the mailer to utilize the postage metering account to generate and print a postage indicium having an amount of postage value appropriate to the mail item. Various information, such as postage meter account information, postage parameters (e.g., postage amount, postal class, postal services desired, mail item size and/or weight, etc.), and mail item information (e.g., addressor information, addressee information, mail item size and/or weight, etc.), may be provided to postage server 141 of postage system 140 by computer 151 of mailer system 150. Postage indicia generation software operable upon postage server 141 may utilize some or all such information to generate appropriate postage indicium data of the requested parasitic postage indicium at block 202.

Postage indicia data generated according to embodiments of the invention comprises data sufficient to satisfy requirements of a corresponding postal service provider for proof of payment for postal services. For example, embodiments of the invention may operate at block 203 to generate postage indicia data in conformance with IBI specifications promulgated by the USPS. Such postage indicia data may include information useful in providing the postal services, in discouraging fraud, in facilitating tracking and accounting, etc., such as a digital signature, the aforementioned postage meter account information, postage parameters, and/or mail item information, etc. Techniques for the generation of postage indicia data as shown and described in the aforementioned United States patent applications entitled "Image-Customization of Computer-Based Value-Bearing Items" and "System and Method for Printing Postage Indicia with Post-By Date" may be utilized according to embodiments of the invention.

In order to associate the generated postage indicium data with a corresponding mail item for which it was generated, embodiments herein utilize thin indicium information of a parasitic postage indicium herein. Accordingly, thin indicium information is generated at block 203 of the illustrated embodiment. Such thin indicium information preferably provides substantially unique identification information (i.e., information which is not repeated in typical use, although it may be repeated at intervals sufficiently long to mitigate commonality among viable unique identification information, and thus may be relied upon as substantially unique information) for identification of associated postage indicium data.

Postage indicia data generated according to embodiments of the invention is not printed as postage indicia for applying to mail items as is typically the case with IBI postage metering techniques. Instead, system 100 of embodiments herein operates to store generated postage indicia data as postage indicium data packets at block 204. For example, postage indicium data packets may be stored in database 142 of postage system 141 and/or provided to a postal service provider in vendor log 144 for later use in proof of payment for postal services.

Thin indicium information is preferably stored in association with the aforementioned postage indicium data packets for accessing an appropriate postage indicium data packet using corresponding thin indicia information. For example, thin indicium information may be stored in database 142 of postage system 141 and/or provided to a postal service provider in vendor log 144 in association with (e.g., using indexing, relational database, and/or other associative techniques) corresponding postage indicium data packets as shown by records 143 at block 204 of the illustrated embodiment.

Thin indicium information of embodiments of the invention comprises one or more pieces of information configured to be borne in parasitism within a structure of a mail scan block present on a mail item. For example, thin indicium information may comprise information adapted to be carried as one or more component of mail scan block 111, such as may comprise an IM barcode, present on mail items for a purpose or purposes other than providing postage indicium. The IM barcode of the foregoing exemplary embodiment may be provided for use in routing and providing services by the USPS and may be placed in proximity to the addressee information (shown here as being placed above the addressee information) on the face of mail items in the United States to facilitate its being scanned during mail processing.

As previously mentioned, thin indicium information preferably uniquely or substantially uniquely identifies a postage indicia data packet comprised of postage indicia data. Accordingly, the one or more pieces of information of thin indicium information of embodiments is both configured to be carried within a structure of a mail scan block and to provide substantially unique identification of corresponding postage indicium data.

Figure 3:
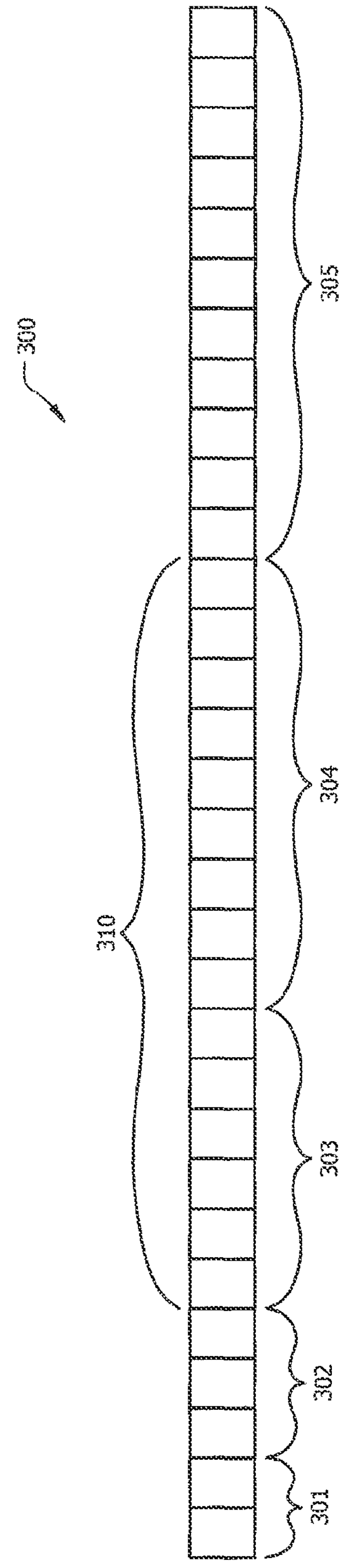
FIG. 3 shows detail with respect to thin indicium information of a parasitic postage indicium as may be utilized with respect to an IM barcode mail scan block according to embodiments of the invention.

Directing attention to FIG. 3, detail with respect to thin indicium information as may be utilized with respect to an IM barcode mail scan block according to embodiments herein is shown. IM barcode components 300 of the illustrated embodiment include barcode identifier 301 (e.g., providing identification of the barcode as a USPS IM barcode), service type identifier 302 (e.g., providing information regarding the postal services to be provided with respect to an associated mail item), mailer identification 303 (e.g., providing identification of mailer generating the IM barcode), sequence number 304 (e.g., providing a number of the relative sequence of the IM barcode in a batch), and delivery point ZIP code 305 (e.g., providing delivery point route and location information).

Embodiments of the invention provide thin indicium information adapted for disposing in mailer identification 303 and sequence number 304 of IM barcode components 300 in parasitism. For example, one or more parasitic postage indicia service provider number unique to a service provider responsible for postage system 140, or otherwise associated with the generation and/or validation of the parasitic postage indicium, may be used in combination with postage indicium identification numbers to provide thin indicium information 310. It should be appreciated that such an embodiment of thin indicium information 310 is adapted to be carried within components of IM barcode components 300 and to substantially uniquely identify a postage indicium data packet generated by postage system 140. In particular, a parasitic postage indicia service provider number may be adapted to be carried within mailer identification 303 of thin indicium information 310 while a postage indicium identification number is adapted to be carried within sequence number 304 of thin indicium information 310 without alternation of IM barcode components 300. For example, special or reserved mailer identification numbers may be utilized according to embodiments of the invention which provide an indication that the mail scan block comprises parasitic postage indicium information. This information may indicate that the sequence number component contains postage indicium identification number and therefore to use these components of the mail scan block to obtain postage indicium data. Thus, the combination of these numbers may be used to substantially uniquely identify postage indicium data by identifying a service provider having generated the postage indicium data and providing a postage indicium identification number or other identifier of the particular postage indicium data generated by that service provider.

Because postage indicium generally has a short useful life (e.g., on the order of weeks), the postage indicium identification number of parasitic postage indicia of embodiments may repeat after all unique numbers available within the space of sequence number 304 have been exhausted and still provide substantially unique identification of the postage indicium data. If, however, additional time (e.g., extended shelf life) is desired before repeating of thin indicium information, the service provider may be provided with a plurality of parasitic postage indicia service provider numbers to allow sequencing through those parasitic postage indicia service provider numbers as the unique postage indicium identification numbers are exhausted.

In operation according to embodiments of the invention, the thin indicium information is disposed in a mail scan block in parasitism for use in identifying the corresponding postage indicium data. Accordingly, referring again to FIGS. 1 and 2, mail scan block 111 including thin indicium information therein may be generated by postage system 140 and provided to mailer system 150 (e.g., as a digital image communicated via network 101) at block 205. Alternatively, thin indicium information may be provided to mailer system 150 (e.g., as a data packet communicated via network 101) for inclusion in mail scan block 111 generated by mailer system 150 at block 205. Computer 151 of mailer system 150 may thus print mail scan block 111 including thin indicium information therein using printer 152 (e.g., as part of postal information block 110).

Mail scan block 111 including thin indicium information may be printed alone or in combination with other information. For example, where mail scan block 111 comprises an IM barcode such an IM barcode may be printed in combination with addressee information 113, such as within postal information block 110. Additionally or alternatively, because inclusion of thin indicium information in parasitism in mail scan block 111 according to embodiments does not alter the mail scan block as generally perceived by humans, and thus provides no readily visible indication regarding the use of parasitic postage indicium (i.e., the presence of thin indicium information), embodiments of the invention may print one or more postage indicium presence demarcation in combination with mail scan block 111. For example, postage indicium presence information 112, such as may comprise a mark, character, message (e.g., U.S. Postage Paid), postage amount (e.g., $0.44), etc., may be provided as a humanly readable indication that a parasitic postage indium is provided with respect to the mail item. As other examples of other information that may be printed in combination with mail scan block 111 including thin indicium information, addressor information (e.g., addressor information 122), postal service information (e.g., First Class Mail, Return Receipt Requested, Airmail, etc.), postal processing information (e.g., FIM 121), and/or the like.

The aforementioned other information may be printed or otherwise provided separately from a mail scan block including thin indicium information according to embodiments of the invention. For example, rather than using envelope media having postal processing information preprinted thereon, such postal processing information may be printed (whether preprinted by a supplier or printed by the mailer) upon label stock separate from postal information block 110. In accordance with an embodiment of the invention, label stock bearing preprinted FIM barcodes are provided for use with mail scan blocks including thin indicium information. Such FIM barcodes are fungible and thus generic to the particular mail items, thus application of label stock bearing preprinted FIM barcodes to mail items bearing mail scan blocks including thin indicium information does not present pairing or matching issues as would label stock comprising addressee information and separate label stock comprising corresponding postage indicia information.

It should be appreciated that mail scan block 111 utilized according to embodiments of the invention may be disposed at locations on or within a mail item other than that shown in the embodiment illustrated in FIG. 1. For example, mail scan block 111 may be printed upon contents of a mail item (e.g., a letter document) at an appropriate location to be displayed through an opening (e.g., open or clear covered window) of an envelope. The opening through which the mail scan block is displayed may be disposed at any suitable place on the mail item (e.g., upper left corner, upper right corner, center, along a bottom edge, etc.) and may or may not also display other information (e.g., addressee information, addressor information, postal processing information, etc.). However, locating mail scan block 111 within postal information block 110, or otherwise in proximity to other information being applied to the mail item, facilitates the generation and application of information of parasitic postage indicia herein without access to or control of other portions of the mail item (e.g., the upper right corner of an envelope where postage indicia is typically placed). Accordingly, using the aforementioned envelope media having postal processing information (e.g., FIM 121) thereon, valid postage indicia adapted for automated processing may be provided with very limited access to the face of the mail item and/or printing only a single address label (i.e., postal information block 110) according to embodiments of the invention. Moreover, mailers may print information used as postage indicia during address printing without the issues associated with printing postage indicia and addresses separately (whether in time or on separate media).

Mail scan block 111 including thin indicium information therein for providing parasitic postage indium herein may be printed directly or indirectly on mail items. For example, label stock 114 may be utilized as a print medium in printer 152 to accept printing of postal information block 110 including mail scan block 111. Label stock 114 may thus be applied to an appropriate mail item (e.g., mail item 120) when preparing the mail item for postal services at block 206. Alternatively, printer 152 may print mail scan block 111 directly upon a mail item (e.g., on mail item 120) or some portion thereof (e.g., an envelope or box used to contain pieces of the mail item) at block 206. Such printing of the mail scan block may include the aforementioned printing of other information. For example, where an envelope or similar portion of the mail item is used as a print medium in printer 152, information such as FIM 121 and/or addressor information 122 may be printed in combination with mail scan block 111. Additionally or alternatively, print media upon which mail scan block 111 including thin indicium information herein may be provided with other information (e.g., postal processing information such as a FIM, postal services information, etc.) pre-printed thereon. For example, stock (e.g., label stock, envelope stock, etc.) may be specifically provided having information pre-provided thereon for use with parasitic postage indicia herein.

Mail item 120 having mail scan block 111 including thin indicium information therein may be introduced into the mail stream to receive desired postal services. For example, mail item 120 may be deposited into a receptacle (e.g., mailbox 134) of postal service provider infrastructure 130. Thereafter, mail item 120 may be processed by the postal service provider for providing the desired postal services. For example, automated sorting and scanning (e.g., using scanner 133) of the mail item may be performed. Mail scan block 111 is preferably scanned, or the information therein including the thin indicium information otherwise accessed, during one or more steps of the postal service provider mail processing at block 207.

Mail scan block 111 utilized to bear thin indicium information in parasitism according to embodiments of the invention comprises a scan block for which components of postal service provider infrastructure 130 are relatively widely adapted to scan and/or for which components of postal service provider infrastructure 130 are readily adapted to scan. For example, scanning equipment capable of extracting information from IM barcodes has already been relatively widely deployed in mail processing infrastructure of the USPS. Accordingly, as mail item 120 is processed or otherwise handled by postal service provider infrastructure 130 of embodiments, an IM barcode embodiment of mail scan block 111 thereon may be scanned (perhaps for purposes other than or in addition to proof of payment verification) and the thin indicia information extracted for identifying a corresponding postage indicia data packet for proof of payment for postal services.

Mail server 131 of postal service provider infrastructure 130 of embodiments is adapted to accept input of mail item information, including the aforementioned thin indicium information, to provide various mail item processing functions. In operation according to embodiments, mail server 131 will utilize the thin indicium information to determine that proper payment has been made for the postal services desired with respect to mail item 120. For example, mail server 131 and/or postage server 141 may utilize the thin indicium information (e.g., using information of vender log 144, as may be stored in database 132 of mail server 131, and/or information of records 143, as may be stored in database 142 of postage server 141) to identify a corresponding postage indicium data packet comprised of postage indicium data at block 208. The postage indicium data may be processed to determine its validity as postage indicia (e.g., that appropriate postage value has been paid for the postal services provided with respect to mail item 120) at block 209. For example, where postage indicium data comprises data consistent with that of an IBI based postage indicium, the postage indicium data may be processed for validation using the same techniques used with respect to information scanned from an IBI based postage indicium borne on a mail item.

Once the parasitic postage indicium is validated through use of the thin indicium data and corresponding postage indicium data, mail item 120 may be provided further, appropriate postal services (block 211), such as to provide marking of the mail item (e.g., cancellation, validation, and/or value marking of the thin indicium), delivery processing of the mail item, mail item tracking and reporting, etc., where the thin indicium data is successfully validated. Alternatively, mail item 120 may be refused further postal services (block 210), or otherwise provided with exception processing (e.g., postage due processing, postage value debiting, return processing, etc.), if the thin indicium data is not successfully validated.

It should be appreciated that particular operations of flow 200 may be performed in a different order than illustrated in the embodiment of FIG. 2. For example, the order of the operations described with respect to blocks 202 and 203 above may be reversed or even performed in parallel according to embodiments of the invention.

From the above it can be appreciated that parasitic postage indicia of embodiments herein provides proof of payment for postal services for use in providing postal services borne within a mail scan block of a mail item. Moreover, where mail scan block 111 utilized to bear thin indicium information comprises a scan block for which scanning equipment capable of extracting information from the mail scan blocks has already been relatively widely deployed and/or for which components of postal service provider infrastructure 130 are readily adapted to scan, higher incidents of scanning of the thin indicium information, and thus verification of the parasitic postage indicium, may be performed. Such higher incidents of scanning may facilitate discouraging fraud, improved accounting and auditing, etc.

The relative simplicity of mail scan blocks (e.g., IM barcodes) utilized according to embodiments of the invention not only facilitate the wide spread deployment of postal service provider infrastructure able to scan the mail scan blocks and obtain parasitic postage information of embodiments herein, but also facilitates the use of other devices to provide such scanning. For example, an app may be provided for execution upon portable processor devices, such as smart phones (e.g., IPHONE and DROID devices), tablet devices (e.g., IPAD and DROID tablets), and personal digital assistants (e.g., BLACKBERRY devices), facilitating capture of thin postage indicium data using a camera or other imaging apparatus of such portable processor devices. In such embodiments, a postal carrier, for example, may scan mail items at a point of pickup to determine the inclusion and/or validity of parasitic postage indicia.

It should be appreciated that parasitic postage indicia provided according to embodiments of the present invention may be utilized to provide functionality in addition to or in the alternative to the aforementioned proof of payment for postal services. For example, where mail scan block 111 utilized to bear thin indicium information comprises a scan block for which scanning equipment capable of extracting information from the mail scan blocks has already been relatively widely deployed, scanning of the thin indicium information may be performed at a plurality of locations (e.g., at each postal service provider facility handing the mail item). Using the correspondence between the thin indicium information and the postage indicium data the mailer of the mail item may be identified (e.g., using information in the postage indicium data, information regarding an account used to generate the postage indicium data, etc.). This information may be utilized to provide the mailer with some level of mail item tracking information according to embodiments of the invention.

Moreover, the inclusion of parasitic postage information within a mail scan block, particularly one which is otherwise present upon contents of a mail item, may facilitate the use of parasitic postage indicia herein. For example, various automated applications (e.g., accounts receivable, invoicing, accounts payable, check printing, and other software) may operate to print addressee and/or other information which may already include a mail scan block or otherwise be readily and unobjectionably adapted to include a mail scan block. Such applications may be adapted to include parasitic postage information of embodiments herein to thereby provide parasitic postage indicia where traditional postage indicia (e.g., IBI based postage indicia) is unacceptable (e.g., due to size, appearance, etc.).

Although embodiments have been described herein with reference to printing mail scan blocks including parasitic postage indicia information (e.g., thin indicia information) therein, it should be appreciated that the concepts of the present invention are not limited to printed embodiments of mail scan blocks. For example, embodiments may utilize RFID tags provided as mail scan blocks upon mail items to carry parasitic postage information herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

receiving, by a postage system, a request to generate postage indicium data providing proof of payment for postal services of a postal service provider from a mailer system; generating, by the postage system, the postage indicium data and parasitic postage indicium data based on the request, wherein the postage indicium data comprises data sufficient to satisfy requirements of the postal service provider for proof of payment for a postal service identified in the request, wherein the parasitic postage indicium data comprises thin indicium information configured to be carried in one or more components of a mail scan block without alteration of a structure of the mail scan block, wherein the mail scan block comprises a scan block for which components of postal service provider infrastructure are configured to scan for a purpose other than for postage indicia processing, and wherein the thin indicium information includes information that provides substantially unique identification of the postage indicium data;

storing, by the postage system, the postage indicium data in a database; and transmitting, by the postage system, the parasitic postage indicium data to the mailer system, wherein the mailer system prints the mail scan block having the parasitic postage indicium data embedded therein for a mail item, and wherein verification of proof of payment for the postal service associated with the mail item is based on the postage indicium data stored in the database, and wherein the postage indicium data is identified based on the substantially unique identifying information included in the thin indicium information extracted via a scan of the mail scan block.

2. The method of claim 1, wherein the thin indicium information is configured to be extracted from the mail scan block by scanning equipment of postal service provider infrastructure configured to accept input of mail item information.

3. The method of claim 1, wherein the mail scan block is configured to be scanned to provide information for tracking.

4. The method of claim 1, wherein the mail scan block comprises an intelligent mail barcode.

5. The method of claim 4, wherein the thin indicium information is adapted to be carried in a mailer identification component and a sequence number of the intelligent mail barcode.

6. The method of claim 1, wherein the postage indicium data comprises information selected from the group consisting of a digital signature, postage meter account information, one or more postage parameters, and mail item information.

7. The method of claim 1, wherein a postage account is charged an amount corresponding to a postage value associated with the payment for the postal services of the postal service provider.

8. A system comprising:

a memory storing a database;

one or more processors communicatively coupled to the memory and configured to:

receive a request to generate postage indicium data providing proof of payment for postal services of a postal service provider from a mailer system;

generate the postage indicium data and parasitic postage indicium data based on the request, wherein the postage indicium data comprises data sufficient to satisfy requirements of the postal service provider for proof of payment for a postal service identified in the request, wherein the parasitic postage indicium data comprises thin indicium information configured to be carried in one or more components of a mail scan block without alteration of a structure of the mail scan block, wherein the mail scan block comprises a scan block for which components of postal service provider infrastructure are configured to scan for a purpose other than for postage indicia processing, and wherein the thin indicium information includes information that provides substantially unique identification of the postage indicium data;

store the postage indicium data in the database; and transmit the parasitic postage indicium data to the mailer system, wherein the mailer system prints the mail scan block having the parasitic postage indicium data embedded therein for a mail item, and wherein verification of proof of payment for the postal service associated with the mail item is based on the postage indicium data stored in the database, and wherein the postage indicium data is identified based on the substantially unique identifying information included in the thin indicium information extracted via a scan of the mail scan block.

9. The system of claim 8, wherein the thin indicium information is configured to be extracted from the mail scan block by scanning equipment of postal service provider infrastructure configured to accept input of mail item information.

10. The system of claim 8, wherein the mail scan block is configured to be scanned to provide information for tracking.

11. The system of claim 8, wherein the mail scan block comprises an intelligent mail barcode.

12. The parasitic postage indicium of claim 11, wherein the thin indicium information is adapted to be carried in a mailer identification component and a sequence number of the intelligent mail barcode.

13. The system of claim 8, wherein the postage indicium data comprises information selected from the group consisting of a digital signature, postage meter account information, one or more postage parameters, and mail item information.

14. The system of claim 8, wherein the one or more processors are configured to charge a postage account an amount corresponding to a postage value associated with the payment for the postal services of the postal service provider.

15. A non-transitory computer-readable storage medium storing instructions that, when executed by one or more processors, cause the one or more processors to perform operations comprising:

receiving a request to generate postage indicium data providing proof of payment for postal services of a postal service provider from a mailer system;

generating the postage indicium data and parasitic postage indicium data based on the request, wherein the postage indicium data comprises data sufficient to satisfy requirements of the postal service provider for proof of payment for a postal service identified in the request, wherein the parasitic postage indicium data comprises thin indicium information configured to be carried in one or more components of a mail scan block without alteration of a structure of the mail scan block, wherein the mail scan block comprises a scan block for which components of postal service provider infrastructure are configured to scan for a purpose other than for postage indicia processing, and wherein the thin indicium information includes information that provides substantially unique identification of the postage indicium data;

storing the postage indicium data in a database; and transmitting the parasitic postage indicium data to the mailer system, wherein the mailer system prints the mail scan block having the parasitic postage indicium data embedded therein for a mail item, and wherein verification of proof of payment for the postal service associated with the mail item is based on the postage indicium data stored in the database, and wherein the postage indicium data is identified based on the substantially unique identifying information included in the thin indicium information extracted via a scan of the mail scan block.

16. The non-transitory computer-readable storage medium of claim 15, wherein the thin indicium information is configured to be extracted from the mail scan block by scanning equipment of postal service provider infrastructure configured to accept input of mail item information.

17. The non-transitory computer-readable storage medium of claim 15, wherein the mail scan block is configured to be scanned to provide information for tracking.

18. The non-transitory computer-readable storage medium of claim 15, wherein the mail scan block comprises an intelligent mail barcode, wherein the thin indicium information is adapted to be carried in a mailer identification component and a sequence number of the intelligent mail barcode.

19. The non-transitory computer-readable storage medium of claim 15, wherein the postage indicium data comprises information selected from the group consisting of a digital signature, postage meter account information, one or more postage parameters, and mail item information.

20. The non-transitory computer-readable storage medium of claim 15, wherein a postage account is charged an amount corresponding to a postage value associated with the payment for the postal services of the postal service provider.

* * * * *